United States Patent
Factor et al.

(10) Patent No.: US 9,286,163 B2
(45) Date of Patent: Mar. 15, 2016

(54) DATA RECOVERY SCHEME BASED ON DATA BACKUP STATUS

(71) Applicant: International Business Machines Corporation, Armonk, NY (US)

(72) Inventors: Michael E Factor, Haifa (IL); Itzhack Goldberg, Hadera (IL); Michael Hirsch, Mazkeret Batya (IL); Ronen I Kat, Kfar-Saba (IL); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 13/740,297

(22) Filed: Jan. 14, 2013

(65) Prior Publication Data

US 2014/0201480 A1    Jul. 17, 2014

(51) Int. Cl.
G06F 11/14       (2006.01)

(52) U.S. Cl.
CPC .................................. *G06F 11/1402* (2013.01)

(58) Field of Classification Search
CPC .................................................. G06F 11/1402
USPC ........................................................ 711/154
See application file for complete search history.

(56) References Cited

U.S. PATENT DOCUMENTS

| | | | |
|---|---|---|---|
| 7,409,586 B1 * | 8/2008 | Bezbaruah et al. | 714/13 |
| 7,620,843 B2 | 11/2009 | Zohar et al. | |
| 7,739,544 B2 | 6/2010 | Yamato et al. | |
| 8,006,128 B2 | 8/2011 | Olster | |
| 8,131,681 B1 | 3/2012 | Hangud et al. | |
| 8,539,169 B1 * | 9/2013 | Fisher et al. | 711/154 |
| 2009/0307426 A1 | 12/2009 | Galloway et al. | |
| 2012/0016839 A1 | 1/2012 | Yuen | |
| 2012/0136832 A1 | 5/2012 | Sadhwani | |

FOREIGN PATENT DOCUMENTS

WO       2009157086       12/2009

OTHER PUBLICATIONS

Pivot3, "Serverless Computing Technology Overview", Pivot3® Serverless Computing, Technology Overview, Apr. 2010.
Zhang et al., "DADA: Duplication Aware Disk Array", Conference: FAST '11.Vijayan Prabhakaran, Microsoft Research, 2011.
IP.com, "Taking advantage of naturally occurring duplicate data", IP.com Prior Art Database Disclosure, Disclosure No. IPCOM000188068D, Publication Date: Sep. 22, 2009. URL:// http://ip.com/IPCOM/000188068.

(Continued)

*Primary Examiner* — Yong Choe
(74) *Attorney, Agent, or Firm* — Scott S. Dobson (57) ABSTRACT

Machines, systems and methods for increasing data resiliency in a computing system, the method comprising distinguishing between first data and second data stored in one or more data storage mediums, wherein the first data is more vulnerable than the second data for the purpose of recovering lost data; and recovering the first data before recovering the second data. Increasing redundancy protection for the first data to increase chances for data recovery by way of data reconstruction; and decreasing redundancy protection for the first data, after the first data has been backed up at least once.

19 Claims, 5 Drawing Sheets

(56) References Cited

OTHER PUBLICATIONS

Devang Panchigar, "NetApp's RAID-DP (Enhanced RAID 6)", Feb. 18, 2009. URL:// http://gestaltit.com/all/tech/storage/devang/netapps-raiddp-enhanced-raid-6/.

IBM, "Disaster recovery strategies with tivoli storage management", IBM Redbook, Tivoli Software, Nov. 2002.

Alex Davies, "Implementing highly available data protection with veritas net backup", Symantec White Paper, Jan. 2008.

Roselinda R. Schulman, "Disaster recovery issues and solutions", Hitachi Data Syatems, Sep. 2004.

* cited by examiner

DATA RECOVERY SCHEME BASED ON DATA BACKUP STATUS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to data recovery in a computing environment and, more particularly, to data recovery and restoration, using a data redundancy scheme, according to the backup status of the data being restored.

BACKGROUND

When data stored on a data storage medium is compromised (i.e., corrupted or lost), a data recovery scheme may be deployed to reconstruct or restore the compromised data. Data restoration is one way of recovering data and typically requires restoring or rebuilding more than just the compromised data (e.g., requires restoring an entire volume of data) from a backup medium. Restoration may not be most efficient if backed up data is retrieved from storage media that is remote or comparatively slow or if restoration from backup storage requires restoring more than just the data that has been compromised. For example, to restore five bytes of compromised data, 500 megabytes of backed up data may have to be restored.

A more efficient data recovery scheme may be designed based on a redundancy mechanism which creates extra resiliency by duplicating or adding parity to data stored on relatively fast storage media that are readily and locally available. This is in contrast data recovery from slower and remotely located storage media that is typically used for data restoration from backup media. Without going into a high level of detail, in a redundant system, the corrupted or lost data is generally reconstructed based on metadata and redundancy factors built in the system, quickly and without the delays associated with having to restore a large volume of data from a backup storage medium. This means that data reconstruction using a redundancy mechanism may be achieved in a fraction of the time as it would take to restore the data from a backup system.

Data backup is important for disaster recovery in case the data redundancy mechanism is unable to reconstruct lost or corrupted data. Since data backup takes place periodically, data that is written or updated after the latest backup process has no copies in the backup storage. Thus, newly written or updated data is most vulnerable if the redundancy mechanism fails. That is, the newly updated data can neither be reconstructed from a failed redundancy mechanism nor can it be restored from the backup media. Even if the redundancy mechanism is functional, during the time period in which the data is being reconstructed, only one copy of the data exists. As reconstruction time grows, the window of exposure grows. As disk volume grows, the quantity of data exposed grows.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for increasing data resiliency in a computing system, the method comprising distinguishing between first data and second data stored in one or more data storage mediums, wherein the first data is more vulnerable than the second data for the purpose of recovering lost data; and recovering the first data before recovering the second data. The method may further comprise increasing redundancy protection for the first data to increase chances for data recovery by way of data reconstruction; and decreasing redundancy protection for the first data, after the first data has been backed up at least once.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
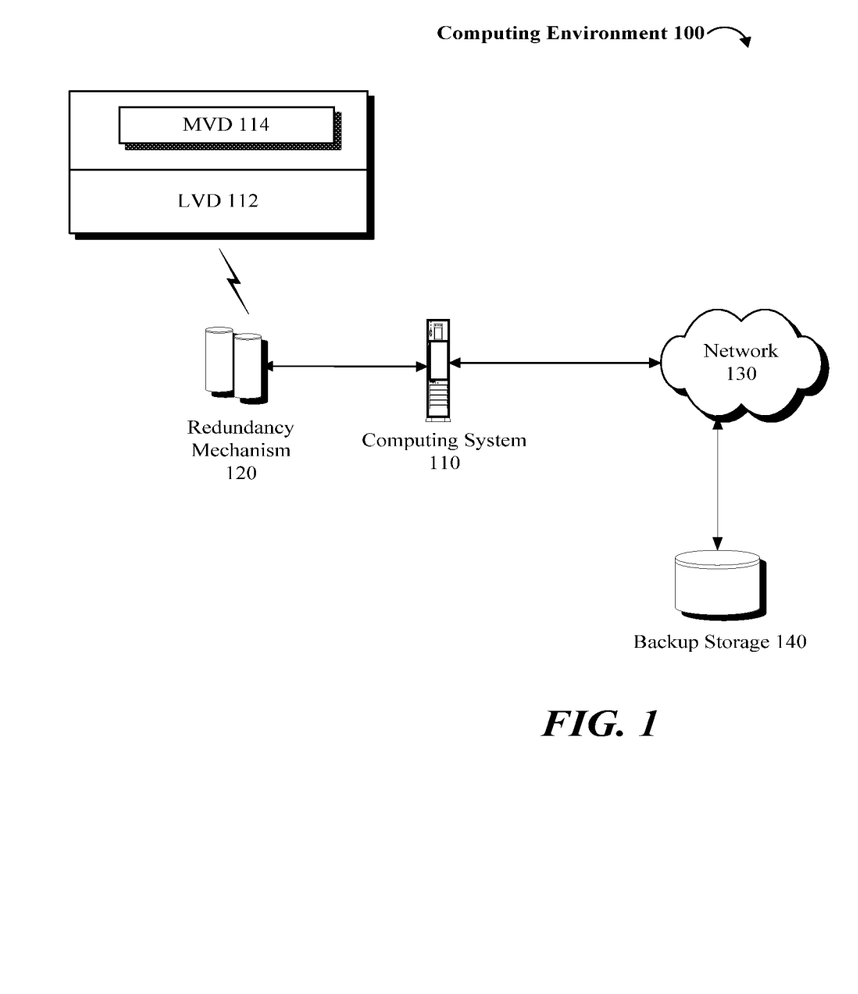
FIG. 1 illustrates an exemplary computing environment in accordance with one or more embodiments, wherein data backup and data redundancy mechanisms are utilized.

Referring to FIG. 1, an exemplary computing environment 100 is illustrated in which a computing system 110 is utilized in connection with a data redundancy mechanism 120. The data redundancy mechanism 120 is configured to make redundant (i.e., duplicate) copies of data used by computing system 110. Data redundancy mechanism 120 may be used to reconstruct data that may be lost or corrupted. Computing system 110 may be also connected to backup storage 140 over a network 130. Backup storage 140 may be utilized to store backup copies of data used by computing system 110 from time to time.

Figure 2:
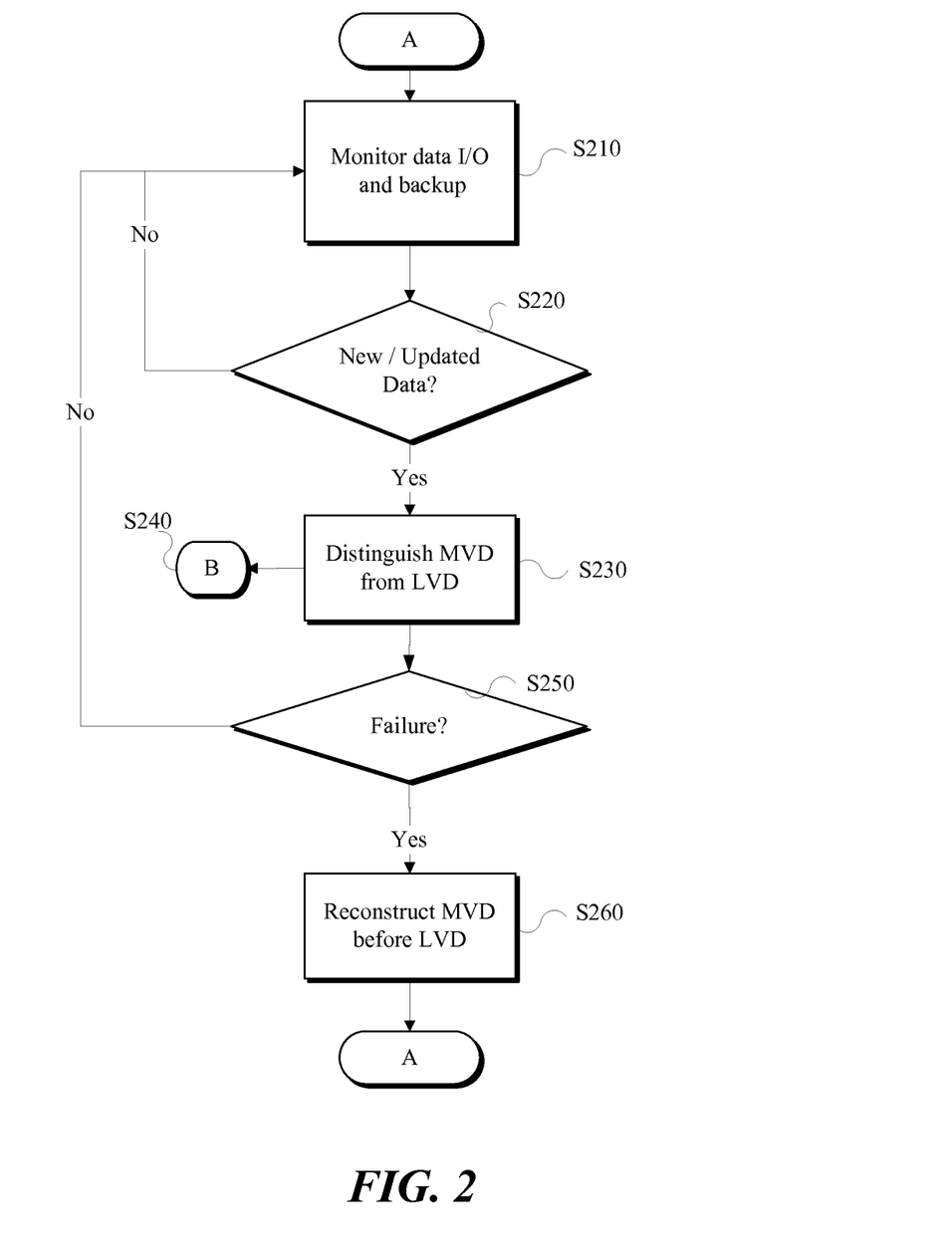
FIG. 2 is a flow diagram of an exemplary method of enhancing data integrity in a data storage system, in accordance with one embodiment.

Referring to FIGS. 1 and 2, in accordance with one embodiment, computing system 110 may be configured to monitor data input/output (I/O) to storage media as well as data backup (S210). When new data is written to a storage medium (e.g., a drive local to computing system 110) or when data previously stored on the storage medium is updated (S220), computing system 110 may distinguish between the more vulnerable data (MVD) and the less vulnerable data (LVD) (S230). For the purpose of this disclosure, MVD may comprise data that has been most recently written or updated and remains without a copy in backup storage 140 and LVD may comprise data that has been at least backed up once in backup storage 140.

It is noteworthy that depending on implementation, MVD and LVD may be distinguished based on different factors. For example, MVD may comprise data that has been backed up less than X number of times, and LVD may comprise data that has been backed up more than Y number of times. The decision about which data is more or less vulnerable may be made based on factors other than the number of times the data has been backed up. Thus, without detracting from the scope of the claimed subject matter, we note that the notion of MVD and LVD as disclosed herein is exemplary in nature and these exemplary embodiments should not be used to narrowly construe the scope of the claims.

Referring back to FIG. 2, once MVD and LVD are distinguished, a failure (e.g., a data corruption or data loss) may be detected (S250). Data corruption or data loss may occur, for example, as a result of a physical failure of the data storage medium on which the data is stored or as the result of a failure in the mechanism used to write the data to the storage medium, or for other reasons. Regardless of the cause, if it is determined that the data is compromised, the data may be reconstructed by way of the redundancy mechanism 120. In one embodiment, MVD is reconstructed before LVD (S260). As such, data that has a higher chance of loss is reconstructed first. This implementation helps ensure a higher data integrity.

Figure 3:
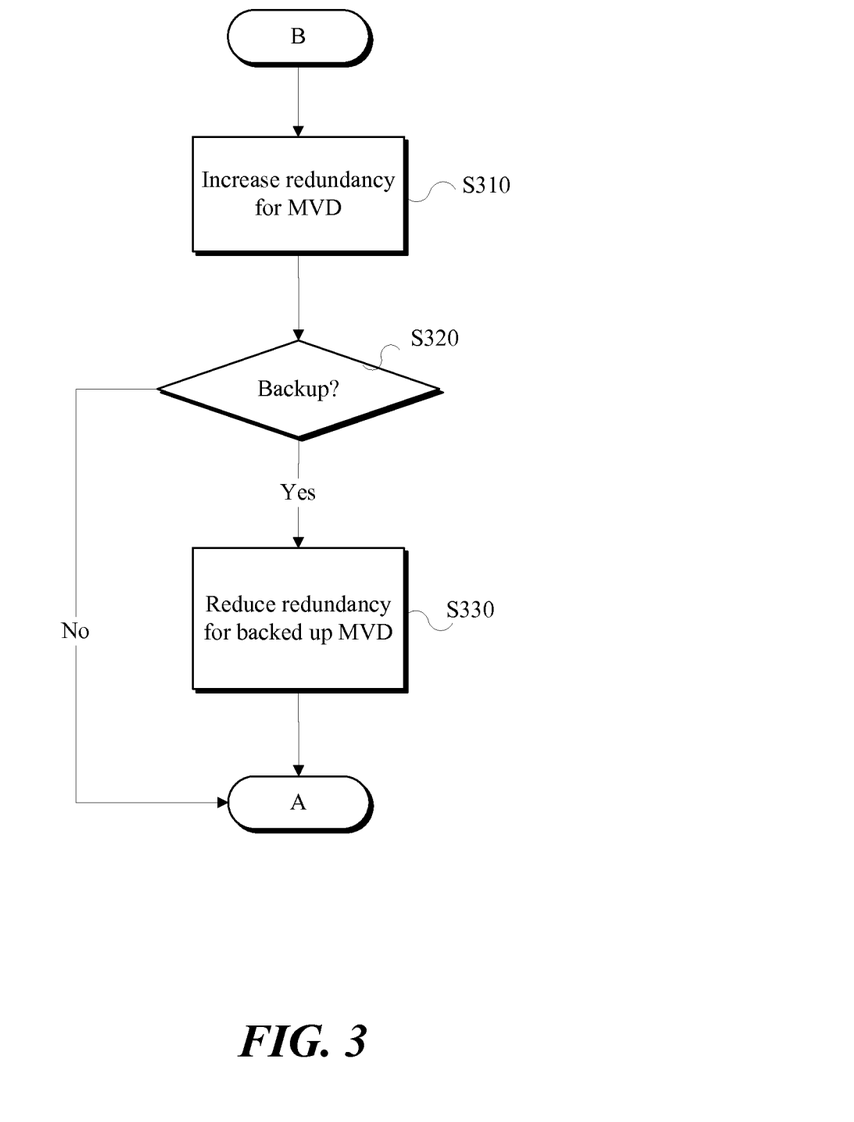
FIG. 3 is a flow diagram of an exemplary method of further enhancing data integrity in a data storage system, in accordance with one embodiment.

Referring to FIGS. 2 and 3, to increase the data integrity even further, in one embodiment, once MVD and LVD are distinguished (S230, S240), redundancy mechanism 120 increases the redundancy for MVD (S310). In other words, if it is determined that certain data is more vulnerable than a threshold value (e.g., the data has been backed up less than X number of times), then the data may be duplicated one or more times, or extra parity may be added, depending on implementation. The added redundancy for the MVD helps increase data integrity in case the main copy of the MVD is corrupted or lost and makes it possible for the compromised data to be more easily and confidently reconstructed by the redundancy mechanism 120 using the implemented extra resiliency mechanism.

In one embodiment, after implementing the additional resiliency for the MVD, it is determined whether the MVD with added redundancy is subject to a backup process (S320). If so, then redundancy mechanism 120 reduces the redundancy for the MVD (S330) after one or more backup copies of the MVD are successfully stored in backup storage 140, by decreasing the number of duplicate copies or reducing the amount of parity information associated with the MVD for the purpose of data reconstruction by redundancy mechanism 120. Once one or more backup copies of the data are stored in the backup storage 140, the status of the MVD may be changed to LVD. The change in status, depending on implementation, may be structured so that it is based on degrees of vulnerability, as opposed to a strict switch from "vulnerable" status to "non-vulnerable" status, for example.

In the above portion of the application, concepts and procedures for data recovery and restoration according to the backup status of the data being recovered are provided in a certain level of detail. In the following, additional levels of detail are introduced in relation to particular systems and environments for the purpose of providing a higher level of disclosure. It is noteworthy that the additional details and particulars discussed below are not to be construed as limiting the scope of the claims to the disclosed exemplary details. Depending on implementation, certain details or features may or may not be needed for the purpose of full functionality. Nevertheless, such features are disclosed without any intention to detract from the scope of the claimed subject matter.

As provided earlier, in one embodiment, in order to recover from data loss (either because of hardware or software failures) it is desirable to keep duplicate copies of data for the purpose of restoration or reconstruction. The time to restore a failed disk by way of restoration from backup storage 140 may be proportional to the size of the storage media (e.g., disk) on which the data is stored. That is, the bigger the size of a disk is, the longer it takes to recover its data from a backup copy. In contrast to restoration from backup storage 140, data may be reconstructed from redundancy mechanism 120. An example of a redundancy mechanism 120 is a system built based on a redundant array of independent disks, commonly referred to as RAID technology.

RAID combines multiple disk drive components into a logical unit. Data is distributed across the drives in one of several ways called "RAID levels", which define how data is distributed and provide a defined or desired level of redundancy and performance. RAID technology may thus be used to divide and replicate data among multiple physical drives. Different schemes or architectures named by the word RAID may be followed by a number (e.g., RAID 0, RAID 1). Each scheme provides a different balance between certain goals: reliability, availability, performance and capacity. RAID levels may be used for protection against unrecoverable sector read errors, as well as whole disk failure.

RAID 1 technology, for example, is based on storing a mirror image of data. In RAID 1, data reconstruction time for a disk is the time it takes for a copy of the mirrored data to be made. In a grid-oriented storage system (e.g., IBM XIV storage system) where the data is spread across a plurality of disks, at rebuild time, multiple disks feed data to the replacement disk. A 1 TB disk takes about 30 minutes to be rebuilt. A 3 TB disk rebuild takes about 1.5 hours on XIV. While 30 minutes rebuild time is relatively short, rebuild of large disks exposes the system to the risk of concurrent multiple failures.

In other words, the system may be vulnerable to data loss during the time window in which a rebuild is taking place.

In one embodiment, when data rebuild or reconstruction is needed, MVD in modified blocks or partitions (including blocks of files) since the last backup are flagged and are rebuild or reconstructed first to reduce the chances for data loss incident in case of multiple disks failures in a RAID system. Once the MVD is rebuilt, the LVD may be rebuilt as provided in further detail below. In the case of additional faults, the chances are that the reconstruction of the MVD (i.e., new data which is not found in the backup storage 140) has completed and there is sufficient data resiliency implemented to handle the additional failure. The LVD for which the reconstruction is not completed, may be recovered from the backup storage 140.

In one implementation, an image backup system (e.g., provided by storage systems such as IBM's Tivoli Storage Manager) may be utilized. Backup images of the logical unit numbers (LUNs) may be used to backup respective LUNs' logical block addressing (LBAs) and as such allow the backup system to retrieve the LBA upon request.

In one implementation, a file-level backup system may be augmented to include the backup of the file-system metadata (directory entries and file i-nodes). This may be accomplished by adding new hidden i-nodes which point to the data and enable backup onto a chosen media. The augmented file-back system may reassemble the files metadata using the file-backup, and then to retrieve the requested LBA upon request. In one embodiment, backup storage 140 may leverage the user backup library or it may be an integral element of the storage system.

In accordance with one embodiment, tracked changes may be covered by a higher data resiliency scheme, such as parity based RAID 6 implemented in the redundancy mechanism 120. Once said tracked changes are backed up, redundancy mechanism 120 may regress back to holding one mirror copy, or a lower resiliency level, such as RAID 5, for example. This approach increases the reliability of the data inside the storage and reduces the need to access backup storage 140.

In one implementation, relevant copies stored by either backup 140 or mirrors or redundancy mechanism 120 may be used for recovery purposes when needed. Concurrently to data rebuild, the disk array may receive requests to read/write data that has suffered from a double failure that has not yet been rebuilt. The disk array may use the mechanisms discussed above to rebuild the data with higher vulnerability prior to servicing the read/write requests.

In one embodiment, the vulnerable data may be stored more than twice to make it resilient to double failures. After the vulnerable data has been backed up, one or more of the redundant copies may be deleted and the space used may be recycled. For file systems, the tracking of modified data may involve recording the modified files and the blocks (offsets) which are modified. In case of a rebuilt event, the list of lost file i-nodes may be marked as highly vulnerable, for example, and rebuild first. Using the file i-node data which has been fully rebuilt, the list of modified data (i.e., file i-node and blocks offsets) may be built before the rest of the lost data. In case of a second failure, the data may be built from backup as the file i-node data is successfully rebuilt. The data blocks of each file may be restored from the backup set.

In an embodiment, XIV storage system may be utilized, where the used space in, for example, 1 MB partitions, is tracked, where data backup is either accomplished by way of building an image backup or where a backup utility is capable of backing up relevant metadata (in addition to the user data). In one example embodiment, the changed data may be tracked in a 1 MB granularity and the backups are performed by way of snapshots. Optionally, an entry in a partition table (unique per module) may have a (e.g., one bit size) which is set to a first value (e.g., '1') when data is new and reset to a second value (e.g., '0') when that partition data is known to be in a backup copy.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
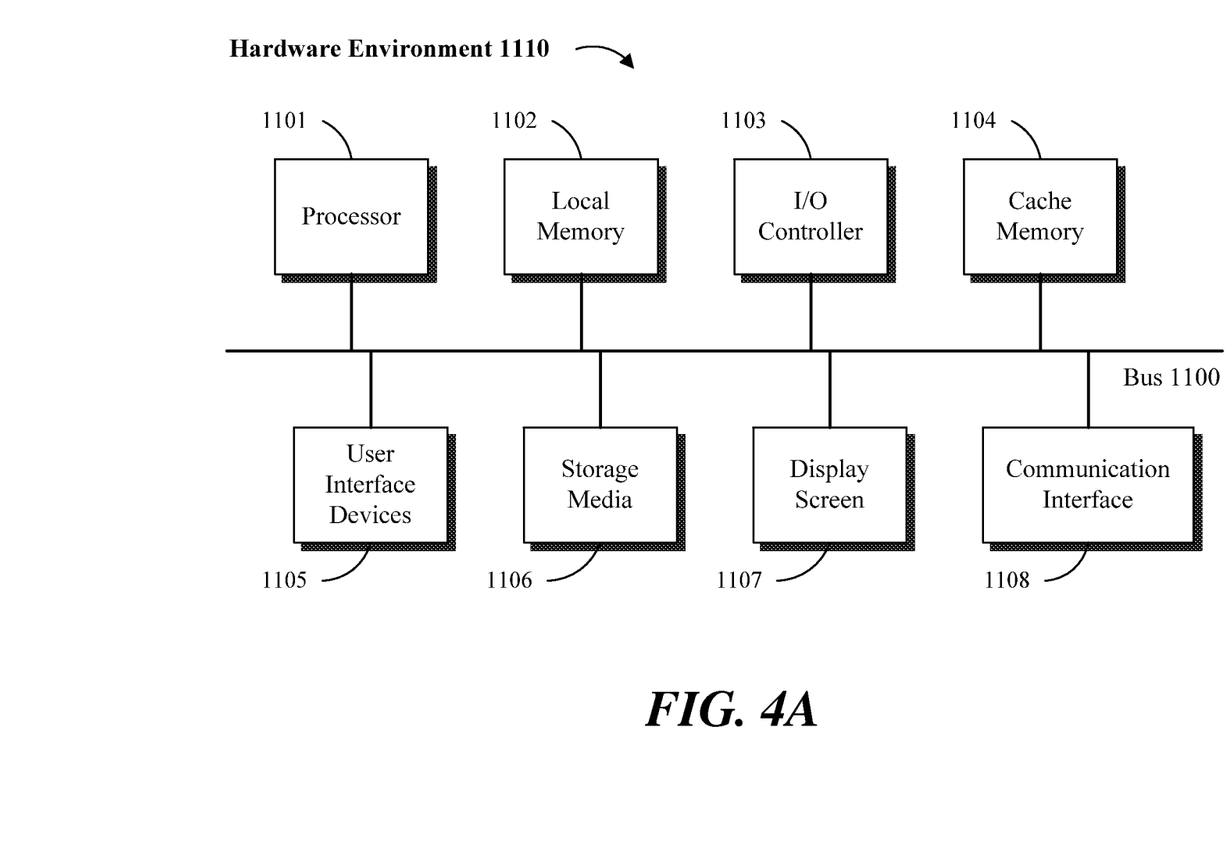
FIGS. 4A and 4B are block diagrams of hardware and software environments in which the disclosed systems and methods may operate, in accordance with one or more embodiments.
Figure 4B:
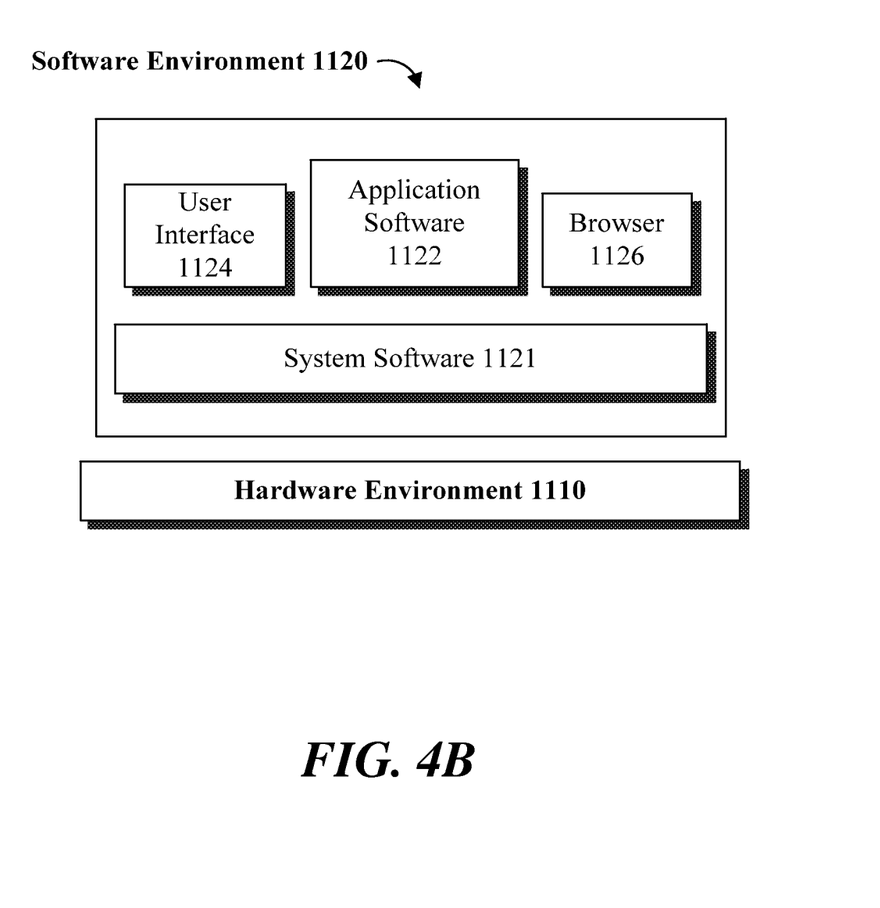

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for increasing data resiliency in a computing system, the method comprising:
    distinguishing between first data and second data stored in one or more data storage mediums, the distinguishing based on the first data being more vulnerable than the second data for the purpose of recovering lost data;
    increasing, based on the distinguishing between the first data and the second data, redundancy protection for the first data to increase chances for data recovery by way of data reconstruction;
    detecting a data failure affecting the first data and the second data;
    recovering, based on the distinguishing between the first data and the second data and in response to the detecting the data failure, the first data prior to recovering the second data;
    identifying tracked changes to data;
    applying, in response to identifying the tracked changes, an increased data resiliency scheme to the tracked changes;
    determining the tracked changes have been backed up; and
    applying, in response to the determining the tracked changes have been backed up, a decreased data resiliency scheme to the tracked changes.

2. The method of claim 1, wherein the second data is less vulnerable than the first data, due to the second data having been backed up more times than the first data.

3. The method of claim 1, wherein the redundancy protection for the first data is increased by way of creating additional copies of the first data.

4. The method of claim 1, wherein the redundancy protection for the first data is increased by way of associating additional parity information with the first data.

5. The method of claim 1, wherein the distinguishing between the first data and the second data comprises determining that the first data has been backed up at least once.

6. The method of claim 1, wherein the first data is recovered using data reconstruction.

7. A method for increasing data resiliency in a computing system, the method comprising:
    distinguishing between first data and second data stored in one or more data storage mediums, the distinguishing based on the first data being more vulnerable than the second data for the purpose of recovering lost data;
    increasing, based on the distinguishing between the first data and the second data, redundancy protection for the first data to increase chances for data recovery by way of data reconstruction;
    detecting a data failure affecting third data and fourth data;
    determining, in response to the detecting the data failure, the third data is more vulnerable than the fourth data for the purpose of recovering lost data;

recovering, based on the determining the third data is more vulnerable than the fourth data, the third data prior to recovering the fourth data:, identifying tracked changes to data;

applying, in response to identifying the tracked changes, an increased data resiliency scheme to the tracked changes;

determining the tracked changes have been backed up; and applying, in response to the determining the tracked changes have been backed up, a decreased data resiliency scheme to the tracked changes.

8. The method of claim 7, wherein the distinguishing between the first data and the second data comprises determining that the first data has been backed up at least once.

9. The method of claim 7, wherein the redundancy protection for the first data is increased by way of associating additional parity information with the first data.

10. A system for increasing data resiliency in a computing system, the system comprising:
- a processor, a computer readable storage medium, and program instructions stored on the storage medium for execution by the processor, the program instructions configured to cause the system to perform a method, the method comprising:
- distinguishing between first data and second data stored in one or more data storage mediums, the distinguishing based on the first data being more vulnerable than the second data for the purpose of recovering lost data;
- increasing, based on the distinguishing between the first data and the second data, redundancy protection for the first data to increase chances for data recovery by way of data reconstruction;
- detecting a data failure affecting the first data and the second data;
- recovering, based on the distinguishing between the first data and the second data and in response to the detecting the data failure, the first data prior to recovering the second data;
- identifying tracked changes to data;
- applying, in response to identifying the tracked changes, an increased data resiliency scheme to the tracked changes;
- determining the tracked changes have been backed up; and
- applying, in response to the determining the tracked changes have been backed up, a decreased data resiliency scheme to the tracked changes.

11. The system of claim 10, wherein the second data is less vulnerable than the first data, due to the second data having been backed up more times than the first data.

12. The system of claim 10, wherein the redundancy protection for the first data is increased by way of creating additional copies of the first data.

13. The system of claim 10, wherein the redundancy protection for the first data is increased by way of associating additional parity information with the first data.

14. The system of claim 10, wherein the distinguishing between the first data and the second data comprises determining that the first data has been backed up at least once.

15. A computer program product comprising a non-transitory computer readable storage medium having a computer readable program, wherein the computer readable program when executed on a computer causes the computer to:
- distinguish between first data and second data stored in one or more data storage mediums, the distinguishing based on the first data being more vulnerable than the second data for the purpose of recovering lost data;
- increase, based on the distinguishing between the first data and the second data, redundancy protection for the first data to increase chances for data recovery by way of data reconstruction;
- detect a data failure affecting the first data and the second data;
- recover, based on the distinguishing between the first data and the second data and in response to the detecting the data failure, the first data prior to recovering the second data;
- identify tracked changes to data;
- apply, in response to identifying the tracked changes, an increased data resiliency scheme to the tracked changes;
- determine the tracked changes have been backed up; and
- apply, in response to the determining the tracked changes have been backed up, a decreased data resiliency scheme to the tracked changes.

16. The computer program product of claim 15, wherein the second data is less vulnerable than the first data, due to the second data having been backed up more times than the first data.

17. The computer program product of claim 15, wherein the redundancy protection for the first data is increased by way of creating additional copies of the first data.

18. The computer program product of claim 15, wherein the redundancy protection for the first data is increased by way of associating additional parity information with the first data.

19. The computer program product of claim 15, wherein the distinguishing between the first data and the second data comprises determining that the first data has been backed up at least once.

* * * * *